USOO5530840A

United States Patent [19]
Lee et al.

[11] Patent Number: 5,530,840
[45] Date of Patent: Jun. 25, 1996

[54] ADDRESS DECODER WITH MEMORY ALLOCATION FOR A MICRO-CONTROLLER SYSTEM

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 163,790

[22] Filed: Dec. 9, 1993

[51] Int. Cl.[6] .................................................. G06F 12/06
[52] U.S. Cl. .............................. 395/497.04; 395/497.01; 364/464.02
[58] Field of Search ..................... 395/497.01, 497.04, 395/439, 425; 364/464, 464.02; 340/825.44; 382/47

[56] References Cited

U.S. PATENT DOCUMENTS

| | | | |
|---|---|---|---|
| 4,710,882 | 12/1987 | DiGiulio et al. | 364/464 |
| 4,998,203 | 5/1991 | DiGiulio | 364/464.02 |
| 5,305,398 | 4/1994 | Klein et al. | 382/47 |
| 5,377,344 | 12/1994 | Stager et al. | 395/425 |
| 5,426,424 | 6/1995 | Vanden Heuvel et al. | 340/825.44 |
| 5,465,343 | 11/1995 | Henson et al. | 395/439 |

FOREIGN PATENT DOCUMENTS

| | | | |
|---|---|---|---|
| 0080626A3 | 6/1983 | European Pat. Off. | G11C 9/06 |
| 0194660A3 | 9/1986 | European Pat. Off. | G07B 17/02 |
| 0535538A1 | 4/1993 | European Pat. Off. | G06F 12/14 |

Primary Examiner—Kevin J. Teska
Assistant Examiner—Russell W. Frejd
Attorney, Agent, or Firm—Charles G. Parks, Jr.; Melvin J. Scolnick

[57] ABSTRACT

The micro-controller system is comprised of a programmable microprocessor, a plurality of memory units having a plurality of addressable memory registers. The memory units are in bus communication with the programmable processor and an application specific integrated circuit. The application specific integrated circuit includes a circuit for dividing the memory units into a plurality of addressable regions in response to programming of the programmable microprocessor. The microprocessor is programmed such that the initial address for each of the regions is assigned by the most significant address bits, and the uppermost address for the region being programmably defined by an uppermost address for the respective region. The circuit includes a plurality of addressable registers. The microprocessor can address each of the circuit registers and write a respective uppermost address in a respective one of the registers, the respective address corresponding to uppermost addressable registers of the respective addressable regions of the memory units.

3 Claims, 7 Drawing Sheets

ADDRESS DECODER WITH MEMORY ALLOCATION FOR A MICRO-CONTROLLER SYSTEM

RELATED APPLICATIONS

The following co-pending applications are commonly assigned to Pitny Bowes Inc. and have been concurrently filed, U.S. patent application Ser. No. 08/163,627, entitled MULTIPLE PULSE WIDTH MODULATION CIRCUIT; U.S. patent application Ser. No. 08/165,134, entitled DUAL MODE TIMER-COUNTER; U.S. patent application Ser. No. 08/137,460, entitled DYNAMICALLY PROGRAMMABLE TIMER-COUNTER; U.S. patent application Ser. No. 5,377,264 issued on Dec. 27, 1994, entitled MEMORY ACCESS PROTECTION CIRCUIT WITH ENCRYPTION KEY; U.S. patent application Ser. No. 08/163,811, entitled DUAL MODE TIMER-COUNTER; U.S. patent application Ser. No. 08/163,771, entitled MULTI-MEMORY ACCESS LIMITING CIRCUIT FOR A MULTI-MEMORY DEVICE; U.S. patent application Ser. No. 08/163,810, entitled INTERRUPT CONTROLLER FOR AN INTEGRATED CIRCUIT; U.S. patent application Ser. No. 08/163,812, entitled ADDRESS DECODER WITH MEMORY WAIT STATE CIRCUIT; U.S. patent application Ser. No. 08/163, 813, entitled ADDRESS DECODER WITH MEMORY ALLOCATION AND ILLEGAL ADDRESS DETECTION FOR A MICRO-CONTROLLER SYSTEM; U.S. patent application Ser. No. 08/164,100, entitled PROGRAMMABLE CLOCK MODULE FOR POSTAGE METERING CONTROL SYSTEM; and U.S. patent application Ser. No. 08/163,629, entitled CONTROL SYSTEM FOR AN ELECTRONIC POSTAGE METER HAVING A PROGRAMMABLE APPLICATION SPECIFIC INTEGRATED CIRCUIT, unless otherwise noted, all of which patent applications are now pending.

BACKGROUND OF THE INVENTION

The present invention relates to a address decoding system for a micro-controller system and, more particularly, to an address decoding system particularly suited for postage metering applications.

In postage metering machine applications, and like machine applications, a micro-controller system is employed to control both machine control function and system functions. System functions, for example, in the postage metering area, refer to functions as funds accounting, external device interface and user interface function. Machine control functions, for example, refers to such functions as motor control, print control and sensor control.

In electronic postage metering machine, and like devices, it is customary to develop a specific micro-controller system for each model postage meter model to accommodate the unique control requirements of each meter model. Conventionally, a micro-controller system, of the type customarily used in postage metering applications, is comprised of a programmable microprocessor in bus communication with a read-only memory (ROM) or program memory, random access memory (RAM), non-volatile memories (NVMs) and an application specific integrated circuit (ASIC). The ASIC chip provides a unique or custom set of system capabilities particular to the employing postage meter model in response to directives from the microprocessor. The ASIC chip also controls the addressing of data to the memory units. One of the factors which have predicated customizing of the ASIC is the size of the memory units. The process of memory mapping is a conventional practice of assigning fixed memory space to an addressable range based on the size of memory devices intended to be used in the particular control system of the specific electronic postage meter model. Because of this address range tailoring, it has been considered not possible to interchange the control system of one electronic postage meter model for that of another electronic postage meter model where the control requirements between the two electronic postage meters is substantially different necessitating increased memory space.

SUMMARY OF THE INVENTION

It is an objective of the present invention to present an improved micro-controller system which incorporates an ASIC in combination with a plurality of memory devices wherein the ASIC is programmable to set the addressable space of the memory units. The ASIC includes a re-configurable address decoding system which allocates memory address ranges for the respective memory devices according to software established parameters, thereby, allowing any combination of sized memory units to be employed in the micro-controller system.

The micro-controller system is comprised of a programmable microprocessor in bus communication with a read-only memory (ROM) or program memory, random access memory (RAM), non-volatile memories (NVM) and an application specific integrated circuit (ASIC). The ASIC includes an address decoder system. The address decoder system is comprised of a number of Memory Size Registers (MSR), Over-Lay Register (OVR), Address Decoder and illegal address detection. Upon power-up of the control system, the initial state of the ASIC enables the ROM for reading by the micro-controller. During the start-up routine, the MSR registers 0 through 8 are written into with a respective 8-bit address configuring the decoder for the particular system. Each address represents the upper valid address of the system memory map for the memory devices.

For example, the memory map allocates or segments an equal 1 megabyte (mb) of consecutive address sequentially to the ROM, RAM, NVM1, NVM2, NVM3 and Chip Select 1 and 2. Two hundred and fifty six (256 bytes) have been reserved for the ASIC. However, the actual memory space addressable approximate sixteen (16) mb. The memory mapping is configured or re-configured during the power-up writing to the MSR registers which specify the valid usable range for each memory segment as well as the size of the memory block of RAM and ROM to be allowed to be overlaid.

DETAILED DESCRIPTION OF THE PREFERRED EMBODIMENT

Figure 1:
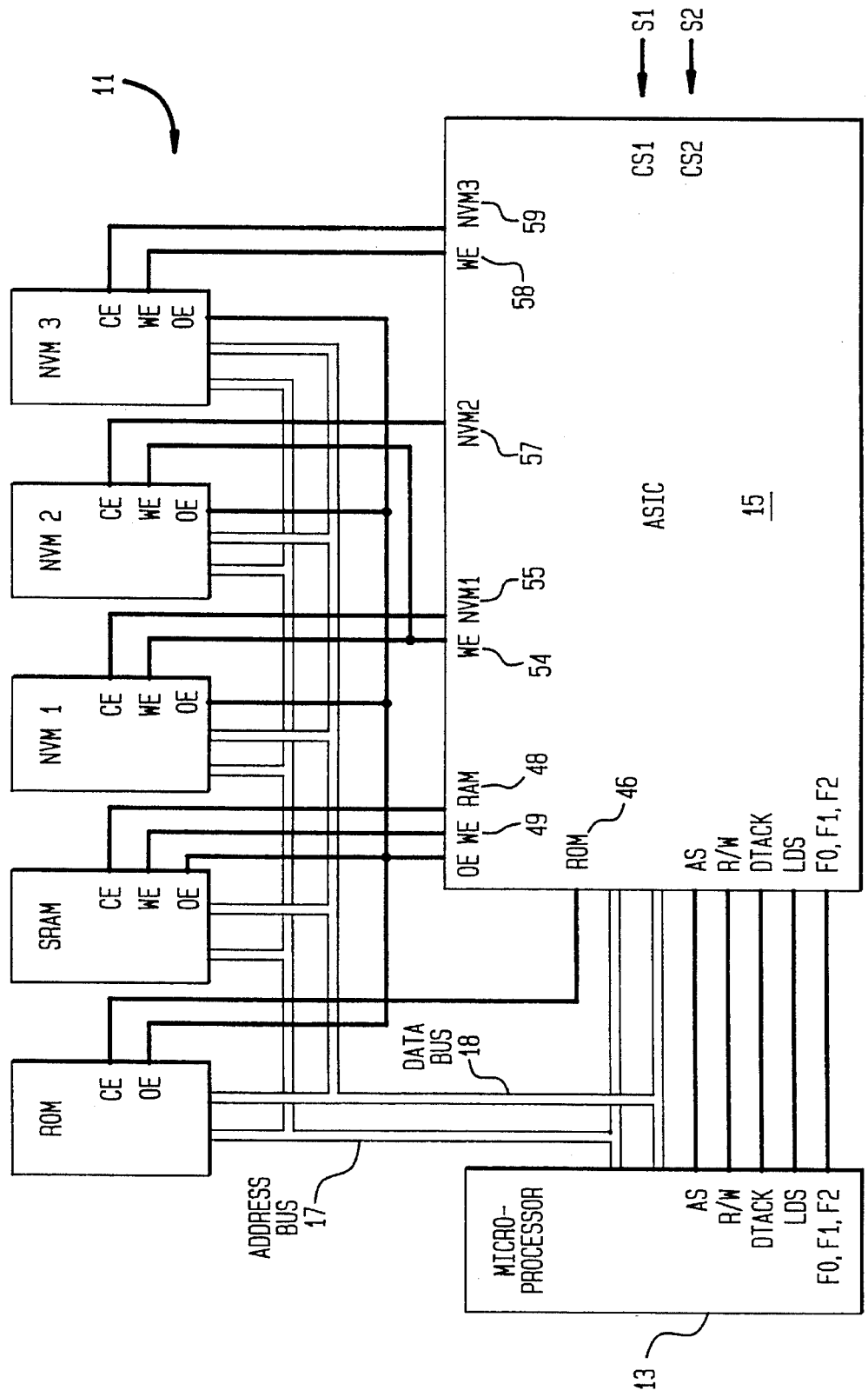
FIG. 1 is a diagram of a micro-controller system in accordance with the present invention.

Referring to FIG. 1, a micro-controller system, generally indicated as 11, is comprised of a microprocessor 13 in bus 17 and 18 communication with an application specific integrated circuit (ASIC) 15, a read only memory (ROM), a random access memory (RAM) and a plurality of non-volatile memories (NVM 1, NVM 2, NVM 3). The microprocessor 13 also communicates with the ASIC and memory units by way of a plurality of control line, some of which will be more particularly described subsequently. It should be appreciated that the ASIC 15 includes a number of circuit modules to perform a variety of control function relative to the operation of the host device, which, in the present preferred embodiment, is a postage meter mailing machine. However, for the purpose of the present invention only the address decoder and memory control functions will be here particularly described.

Figure 2:
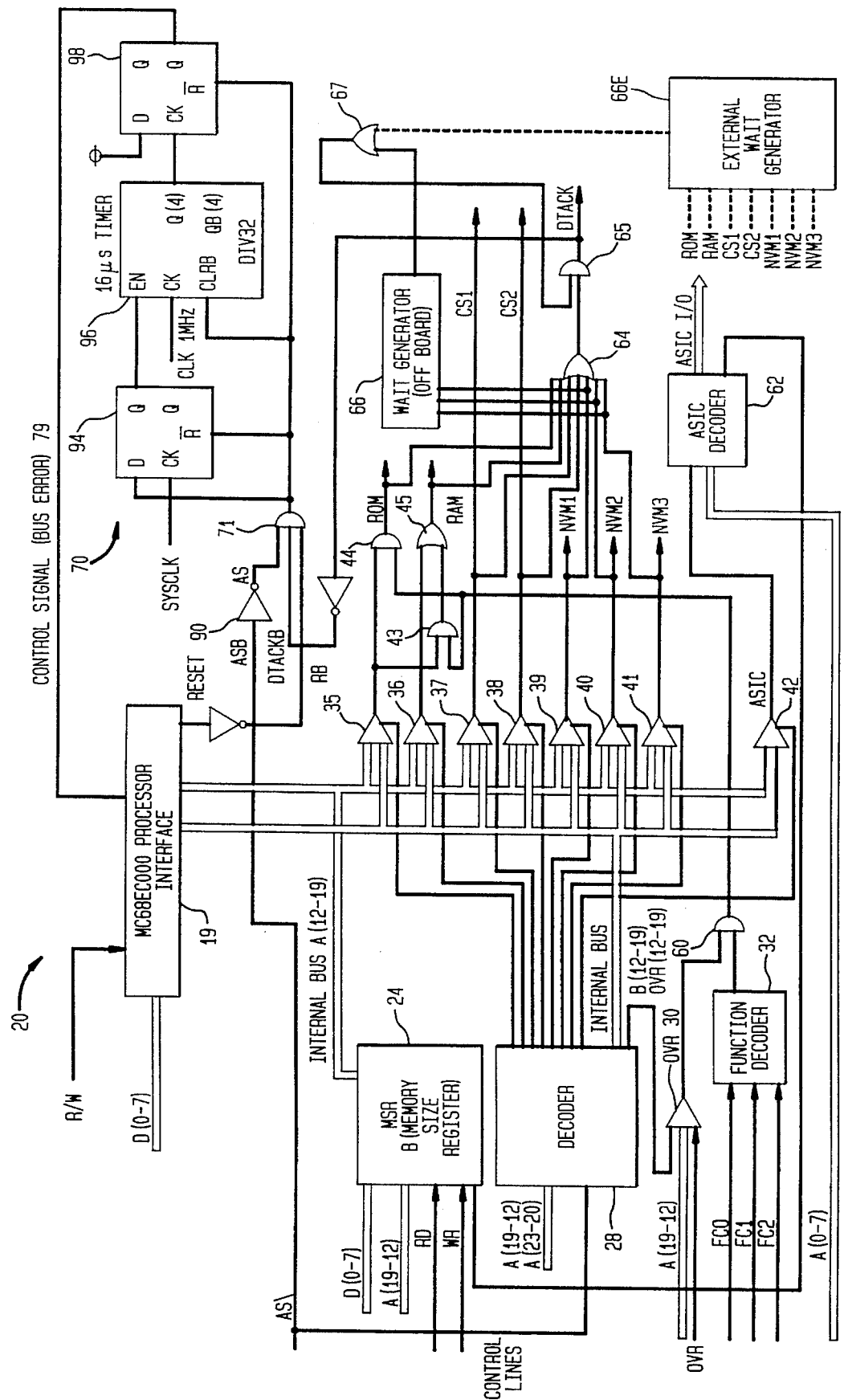
FIG. 2 is a diagram of an ASIC decoder system in accordance with the present invention.
Figure 4:
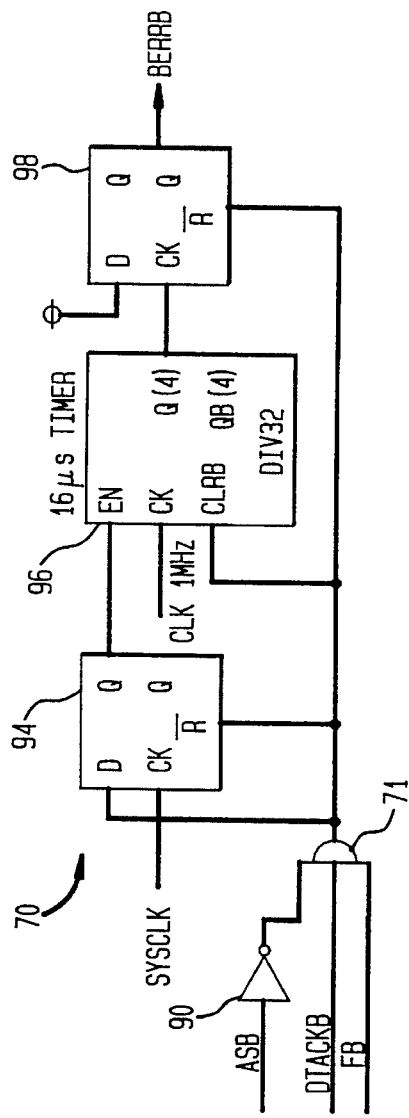
FIG. 4 is schematic of circuit means to generate the Bus Error signal in accordance with the present invention.
Figure 3:
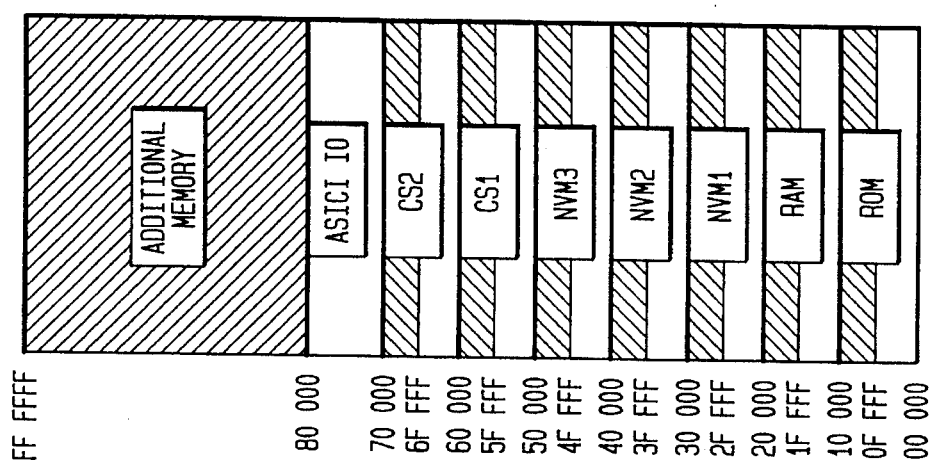
FIG. 3 is a diagram of a memory map of in accordance with the present invention.

Referring to more particularly to FIGS. 2 and 3, the ASIC 15 includes an Address Decoder Circuit, generally indicated as 20. The ASIC 15 includes a processor interface circuit 19 with interface logic necessary to interface the ASIC 15 to the microprocessor 13, which in the preferred embodiment of the present invention is manufactured by Motorola, Model MC68EC000. The processor interface chip 19 functions to provide signal conditioning, among other things, at the detection of an illegal address in a manner subsequently described. The memory size register (MSR) 24 is in communication with the address bus 17 (address bus lines 12–19) to receive an 8-bit address from the microprocessor 13. The address strobe (AS) output from the microprocessor 13 is directed to a memory decoder section 28 and through an inverter 90 to an AND gate 71 associated with the illegal address detection circuit 70 of the system. The decoder 28 also communicates with the address bus 17 (address bus lines 20–23, 12–19) to receive 12-bit address information from the microprocessor 13. Also provided is a memory over-write comparator circuit (OVR) 30 and function decoder unit 32.

The output from the memory size register 24 is carried by the 8 bit internal bus "A" and the output from the decoder 28 is carried by the 8 bit internal bus "B". The respective inputs of each of a plurality of comparators 35 through 42 is in communication with internal bus A and internal bus B. The output of comparator 35 is directed to AND gates 43 and 44 and the output of comparator 36 is directed to an OR gate 45. The output from gate 44 is internally directed to the ROM pin 46 of the ASIC. The output of the gate 45 is internally directed to the RAM pin 48 of the ASIC. The output from comparators 37 and 38 are respectively directed internally to ASIC pins 50 and 52, and are intended to provide a memory write-enable signal for external devices which may be connected to the control system. The outputs of comparators 39, 40 and 41 are respectively directed internally to the chip select pins 54, 56 and 58.

A control signal OVR, from the microcontroller, is directed to the input side of the overlay comparator circuit 30 and enables accessing to the memory address supplied from the decoder 28 to circuit 30 for the ROM-RAM overlay. The function of ROM-RAM overlay will be described subsequently in more detail. Here briefly, the function of ROM-RAM enabled data transfer or program fetch by the microprocessor utilizing the same address range in ROM or RAM depending of the state of control signals "FC0", "FC1" and "FC2". The control signals "FC0", "FC1" and "FC2" are directed, from the microcontroller, to the input side of a function decoder 32. The outputs of the overlay comparator chip 30 and the function decoder 32 are directed to AND gate 60 which has an output directed to the inverse input of gate 44 and input of gate 43. The output of comparator 42 is directed to the input of an ASIC Decoder 62. The output of the ASIC Decoder 62 is use for providing internal addressing of the ASIC 15. A control output of the ASIC 62 is directed to the MSR 24 which enables the memory size memory registers for writing during system power-up.

Referring again to the comparators 37 through 41, gates 44 and 45, the output from each comparators and gates is also directed to an OR gate 64 which has an output directed to gate 65. The output of gate 65 is designated "DTACK". Also the output from each comparator 39, 40 and 41 is directed to a Wait Generator 66. The output of the Wait Generator 66 is directed to the inverse input of gate 65. The output of gate 65 is directed to one input of illegal address detection circuit 70. The Wait Generator 66 outputs, when active, delays the issuance of the DTACK signal for a programmed period of time and also suppresses the timer 96 of the illegal address detection circuit 70 for the same amount of time. The purpose of delaying the DTACK is based on the fact that the write time for external devices may be protracted. Therefore to avoid that, the microprocessor terminates the bus cycle, the issuing of the DTACK signal is delayed an appropriate amount of time.

An illegal address detection circuit, generally indicated as 70 is provided and includes gate 71 which receives the address strobe from the microprocessor, the reset signal from interface 19 and the DTACK signal from the gate 65. Therefore, if an address in an illegal range has been issued, there will not be a DTACK signal issued causing the Q\ output of the flip-flop 98 to go active informing the processor interface 19 of a bus error. It should be appreciated that the processor interface 19 is charged with communicating the proper interrupt to the microprocessor 13.

OPERATION

In the preferred embodiment, the microprocessor interface 19 is intended to contains peripheral capabilities such as print head interface, keyboard and display interface, and asynchronous communication elements for RS232.

The microprocessor 13 operates in either of two modes, program fetch or data transfer mode. The status signals (FC2, FC1, FC0) of the microprocessor 13 indicates the state and cycle of an instruction that the microprocessor is currently executing. The status signals also indicates that the microprocessor is in either program fetch or data transfer mode. The status signals are also used for the ROM-RAM overlay and chip select. Table 1 shows the bit messaging for the function decoder 32.

TABLE 1

| FC2 | FC1 | FC0 | Cycle Time | Chip Select |
|---|---|---|---|---|
| 0 | 0 | 1 | User Data | RAM |
| 0 | 1 | 0 | User Program | ROM |
| 1 | 0 | 1 | Supervisor Data | RAM only |
| 1 | 1 | 0 | Supervisor Program | ROM only |

Figure 5A:
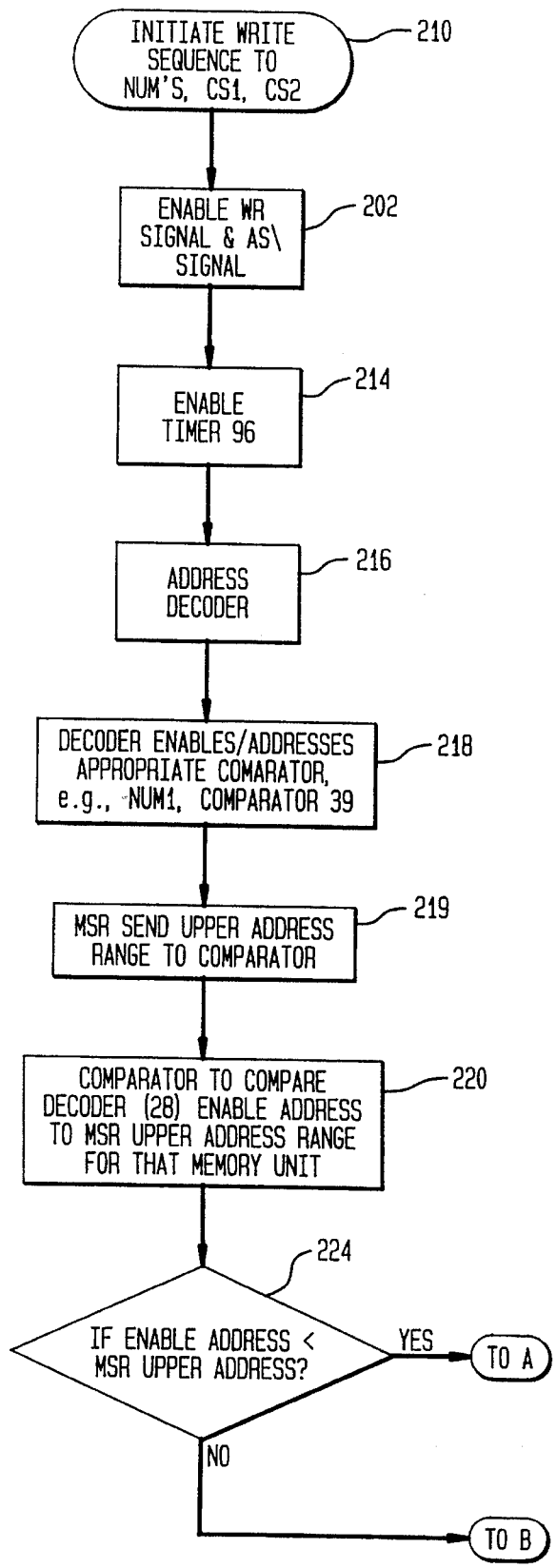
FIGS. 5A to 5E are a logic flow chart of micro-controller system write access to the non-volatile peripheral memories in accordance with the present invention.
Figure 5B:
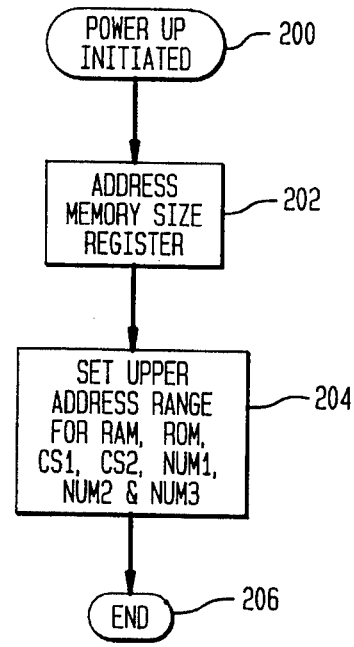
Figure 5C:
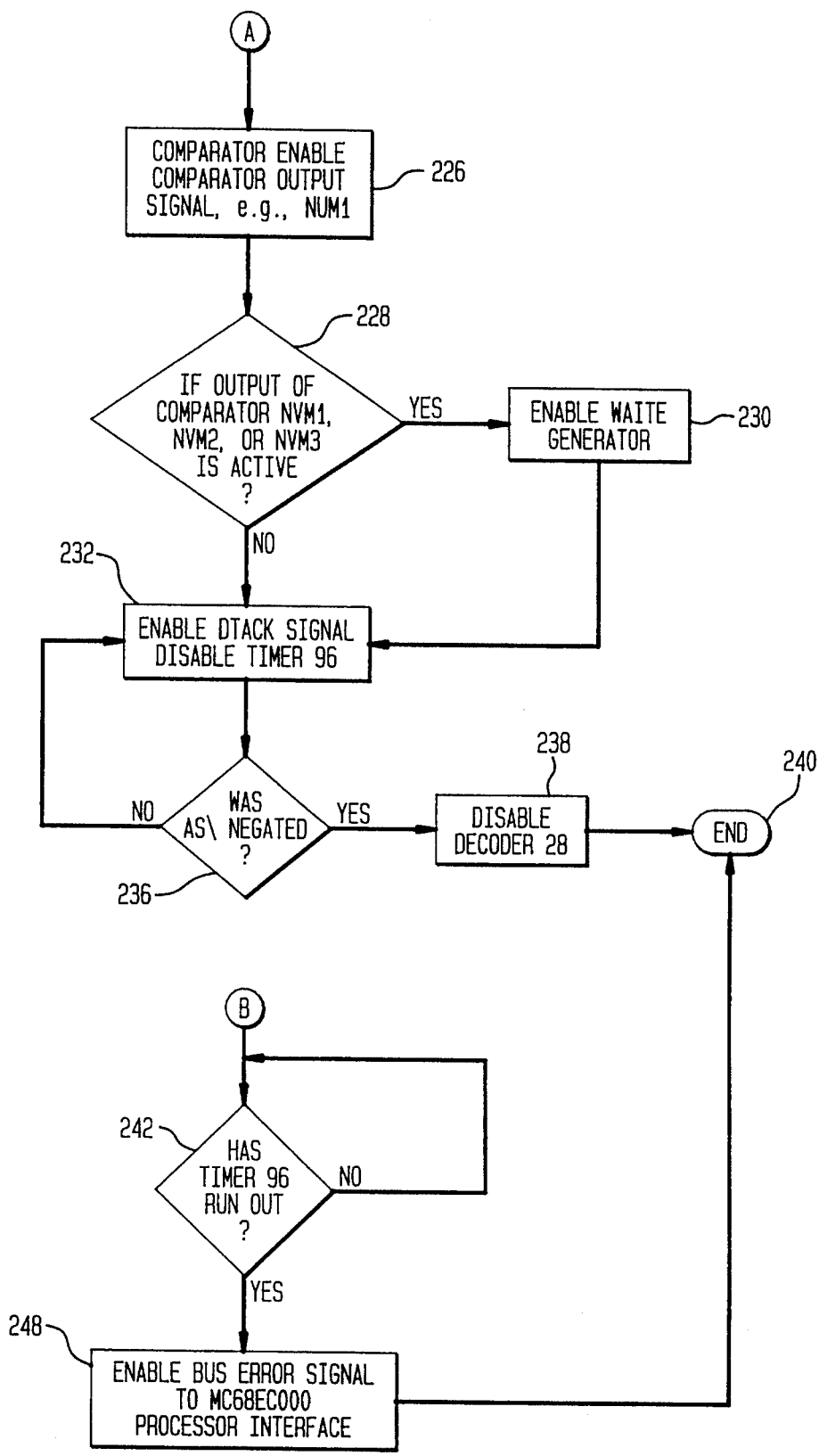
Figure 5D:
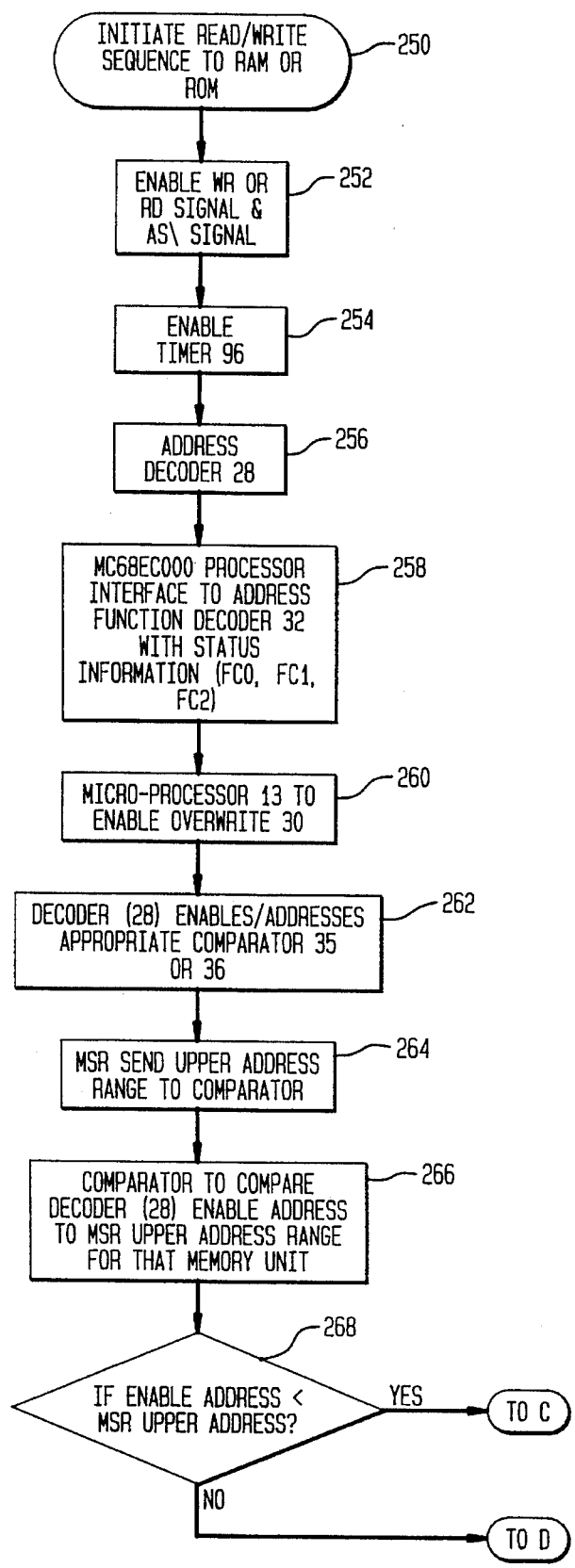
Figure 5E:
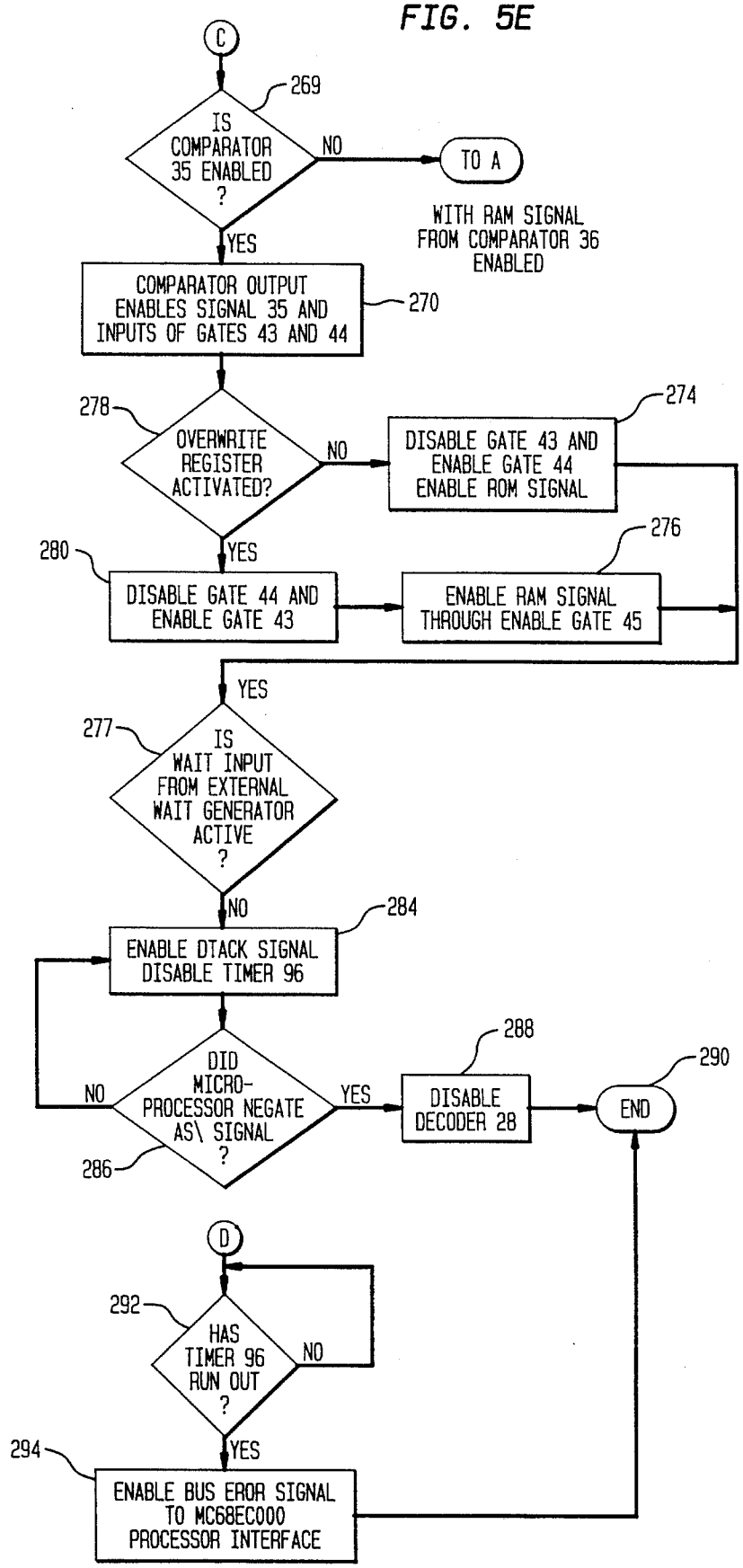

Referring to FIG. 5B, upon power-up, the system is initialized by the microcontroller at 200 which proceeds to address the memory size register at 202. The upper address range for the RAM, ROM, CS1, CS2, NVM1, NVM2 and NVM3 are set at 204 by the microprocessor writing to the MSR. The routine then ends at 206.

Referring to FIGS. 5A through 5E, now described is the procedure for initiating a write sequence to the NVMs or ASIC on board memory. At 250, the sequence is initiated by the microprocessor. At 252, the write enable or read enable signal is activated by the microprocessor and the AS\ signal is enabled. Following at 254, the timer 96 is enabled. Also, the address decoder 28 is addressed by the microprocessor at 256. The processor interface then proceeds to address a function decoder 32 with the status information as afore described at 258. The microprocessor 13 then proceeds to enable the overwrite signal at 260. At 262, the decoder 28 enables the appropriate address comparator 35 or 36. At 264, the upper ranges of the MSR are read through the data bus of ASIC.

The appropriate comparator compares the enable address to the MSR address range for the memory unit at 266. Subsequently, a test is performed at 268 to see if the MSR upper address is greater than the address from the decoder 28. If the address is less than the MSR upper address, the routine proceeds to 269. At 269, a test is performed to see which comparator, 35 or 36 is enabled. If comparator 35 is not enabled then proceed to 226 to enable the appropriate comparator, for example, comparator 36. Description of the operation that follow are continued on page 9, line 8. If comparator 35 is enabled then at 270, the comparator 35 is enabled and the comparator output signal is generated for comparator 35. At which point, the decision is made as to whether the overwrite register has been activated at 278. If the overwrite register has not been activated, the routine proceeds to 274 to enable gate 44 and disable gate 43. If the overwrite register has been activated, then the routine proceeds to 280 to disenable 44 and enable the gate 43 and then proceeds to enable gate 45 at 276. The outputs from gate 44 or 45 is then directed to enable the DTACK signal and disable timer 96 at 284

Following enabling of the DTACK signal, a decision is made as to whether the microprocessor has negate AS\ at 286. If the microprocessor has not negated the AS\ signal at 286, the DTACK signal is held active. If the microprocessor has negated the address strobe AS\, then the decoder 28 is disabled at 288 and the routine is ended at 290.

Returning to 268, if the enable address is greater than the MSR upper address, then the routine proceeds to wait for the timer 96 to time out at 292. When timer 96 has run out a bus error signal is generated at 294 which is delivered to the processor interface for further processing, for example, a system interrupt. Following the bus error signal, the routine then proceeds to 290 to end.

Upon initiation of a write sequence to the non-volatile memories, NVM1, or NVM2 or NVM3 at 210, the process proceeds to 202 where the write enable signal and the AS\ signal are enabled. Following the enabling of the write enable and AS\ signals, the routine proceeds to enable the timer 96 at logic 214 and the microprocessor addresses the address decoder at 216. Pursuant to enabling of the address decoder 28, the appropriate comparator, for example, NVM1, comparator 39 is enabled at 218. During initialization in 200 to 206, the microprocessor addressed the memory size registers to set the proper address range for the respective comparators. The MSR sends the upper limit of addresses for the particular memory block to the respective comparator in 219. A comparator is enabled for comparison of the decoded enabled address to the memory size register upper address range for that memory at 220. Then following enabling of the proper comparator, a decision is made at 224. If the address compared by the comparator is less than that sent from the memory size register, the routine then proceeds to 226 where the appropriate comparator is enabled and the comparator output signal is directed, for example, to NVM1.

Following enabling of the comparator output signal at logic block 226, a test is performed at 228 to see if the output of comparators to NVM1 or NVM2 or NVM3 is activated. If that output is enabled, an enabled wait generator 66 is activated at 230. Following the time out of the wait enable generator, an DTACK signal is generated at 232.

Returning to 228 if the comparator 39, 40 or 41 is not activated, then the DTACK signal is immediately activated at 232. Following enablement of the DTACK, a test is performed to see whether the address strobe has been activated. If the address strobe has not been negated, the DTACK signal remained active. If at 236 the address strobe was negated, the decoder 28 is then disabled at 238 and the routine is ended at logic block 240.

Returning to 224, if the enable address is greater than the MSR upper address range, then the routine proceeds to 242 to wait for timer 96 to run out. When the timer 96 runs out it sets flip-flip 98, the Q\ output therefrom enables a bus error signal to be sent to the processor interface at 248 and the routine is ended at 240. It should now be appreciated that any address issued by the address decoder in response to the microprocessor is tested by the corresponding comparator 35 to 42 depending on the setting of the most significant bits of the issued address.

Referring to FIG. 2, it is noted that the DTACK signal, a System Reset signal from the microprocessor 13 and the AS signal from the timer 96 are inputs to the AND gate 71. The output of the AND gate 71 is directed to the enable input and reset of a flip-flop 94, the clock input of a 16-bit timer 96 and the reset pin of a flip-flop 98. The flip-flop 94 is driven by the system clock. The output from the flip-flop 94 is directed to the enable input of the timer counter 96. The output of the timer counter 96 is directed to the clock input of the flip-flop 98. The enable input of the flip-flop flop 98 is tied active. It should be appreciated that when the AS signal is inactive or the DTACK signal is active or the reset signal is active, the AND gate 71 is set inactive holding flip-flops 94 and 98 and timer 96 in reset.

The afore has described the preferred embodiment of the present invention and should not be viewed as limiting. The full scope of the invention is defined by the appendix claims.

What is claimed is:

1. A micro-controller system comprising:

a programmable microprocessor having means upon initial power-up to generate a plurality of first address information, memory means having a plurality of addressable memory registers, said memory means in bus communication with said programmable microprocessor, circuit means for dividing said memory means into a plurality of addressable regions in response to said first address information, said first address information to sequentially specify the uppermost address for said respective addressable regions, a first of said addressable regions having a predetermined lowermost address.

2. A micro-controller system as claimed in claim 1 wherein said circuit means comprises an address register means having a plurality of memory registers, said microprocessor having means for addressing each of said memory registers and writing said uppermost address in said respective one of said memory registers, said respective uppermost address corresponding to an upper most addressable registers of said respective addressable regions of said memory means.

3. A micro-controller system as claimed in claim 2 further comprising: said microprocessor having means for generating a plurality of second address information, said second address information including first information selecting one of said addressable regions of said memory means and second information specifying a specific addressable register within said selected addressable region and means for comparing said second information generated by said microprocessor to said uppermost address for said selected addressable region and said uppermost addressable region of said sequentially prior addressable region and generate an informing signal to said microprocessor if said second address information is not within said selected addressable region defined by said uppermost addresses.

* * * * *